(12) United States Patent
Line et al.

(10) Patent No.: US 12,246,625 B2
(45) Date of Patent: Mar. 11, 2025

(54) SEATING ASSEMBLY WITH DISPLACEABLE PANEL

(71) Applicant: Ford Global Technologies, LLC, Dearborn, MI (US)

(72) Inventors: Johnathan Line, Northville, MI (US); Joseph Kish, Canton, MI (US); Ratan Howlader, Novi, MI (US); Ian James, Windsor (CA); Robert Shipley, Westland, MI (US); Patrick Davis, Royal Oak, MI (US); Nicholas Alphonse Billardello, Macomb, MI (US); David Frederick Lyons, New Haven, MI (US); Sean West, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/092,501

(22) Filed: Jan. 3, 2023

(65) Prior Publication Data

US 2023/0143122 A1 May 11, 2023

Related U.S. Application Data

(62) Division of application No. 17/190,659, filed on Mar. 3, 2021, now Pat. No. 11,577,631.

(51) Int. Cl.
*B60N 2/20* (2006.01)
*B60N 2/68* (2006.01)
*B60N 2/75* (2018.01)

(52) U.S. Cl.
CPC .............. *B60N 2/20* (2013.01); *B60N 2/686* (2013.01); *B60N 2/767* (2018.02)

(58) Field of Classification Search
CPC .......... B60N 2/20; B60N 2/667; B60N 2/767; B60N 2/686
See application file for complete search history.

(56) References Cited

U.S. PATENT DOCUMENTS

| | | | | |
|---|---|---|---|---|
| 4,715,653 | A * | 12/1987 | Hattori | B60N 2/667 297/284.4 |
| 4,909,568 | A * | 3/1990 | Dal Monte | B60N 2/666 297/284.4 |
| 4,978,170 | A | 12/1990 | Pelz et al. | |
| 5,174,526 | A * | 12/1992 | Kanigowski | B60N 2/6671 297/284.4 |
| 6,361,114 | B1 | 3/2002 | Rumler | |
| 6,523,892 | B1 | 2/2003 | Kage et al. | |
| 6,550,856 | B1 | 4/2003 | Ganser et al. | |
| 6,550,865 | B2 | 4/2003 | Cho | |

(Continued)

*Primary Examiner* — Philip F Gabler
(74) *Attorney, Agent, or Firm* — Vichit Chea; Price Heneveld LLP

(57) ABSTRACT

A seating assembly is provided that includes a seating assembly frame that includes a seatback frame, and a seat frame. The seating assembly further includes a seatback panel coupled to an upper portion of the seatback frame and movable between a stored position relative to the seatback frame and an extended position relative to the seatback frame, and an adjustment mechanism coupled to the seatback panel and the seating assembly frame and movable between a first position and a second position in response to an actuating force.

7 Claims, 15 Drawing Sheets

(56) References Cited

U.S. PATENT DOCUMENTS

| | | | | |
|---|---|---|---|---|
| 7,264,310 B2* | 9/2007 | Holdampf | ................ | B60N 2/66 |
| | | | | 297/284.9 |
| 7,401,852 B2 | 7/2008 | Humer et al. | | |
| 7,458,637 B2* | 12/2008 | Norman | ................... | A47C 7/46 |
| | | | | 297/284.4 |
| 7,549,699 B2 | 6/2009 | Humer et al. | | |
| 9,187,012 B2 | 11/2015 | Sachs et al. | | |
| 9,446,849 B1 | 9/2016 | Pinkal | | |
| 10,245,986 B2 | 4/2019 | Akaike et al. | | |
| 2003/0085600 A1* | 5/2003 | Mori | ....................... | B60N 2/66 |
| | | | | 297/284.4 |
| 2006/0255632 A1* | 11/2006 | Sugimoto | ................ | B60N 2/58 |
| | | | | 297/216.12 |
| 2019/0135151 A1* | 5/2019 | Burton | ..................... | B60N 2/22 |
| 2019/0315252 A1 | 10/2019 | Kapusky et al. | | |
| 2020/0277059 A1 | 9/2020 | Ng | | |

* cited by examiner

SEATING ASSEMBLY WITH DISPLACEABLE PANEL

CROSS-REFERENCE TO RELATED APPLICATION

This application is a divisional of U.S. patent application Ser. No. 17/190,659, filed on Mar. 3, 2021, now U.S. Pat. No. 11,577,631, entitled "SEATING ASSEMBLY WITH DISPLACEABLE PANEL." The aforementioned related application is hereby incorporated by reference.

FIELD OF THE DISCLOSURE

The present disclosure generally relates to a seating assembly for a vehicle with a displaceable panel.

BACKGROUND OF THE DISCLOSURE

Seating assemblies may include movable components that may be placed in different positions to accommodate different seating assembly needs. Improved movable components for seating assemblies are desired.

SUMMARY OF THE DISCLOSURE

According to one aspect of the present disclosure, a seating assembly is provided. The seating assembly includes a seating assembly frame that includes a seatback frame and a seat frame. The seating assembly further includes a seatback panel coupled to an upper portion of the seatback frame and movable between a stored position relative to the seatback frame and an extended position relative to the seatback frame, and an adjustment mechanism coupled to the seatback panel and the seating assembly frame and movable between a first position and a second position in response to an actuating force.

Embodiments of the first aspect of the disclosure can include any one or a combination of the following features:
  in the first position of the adjustment mechanism, the seatback panel is in the stored position;
  in the second position of the adjustment mechanism, the seatback panel is in the extended position;
  a seatback panel pivotable coupling including the seatback panel and the seatback frame and defined by a seatback panel axis of rotation extending through the seatback panel and the seatback frame;
  the adjustment mechanism includes a linkage assembly;
  the first position of the adjustment mechanism includes a collapsed position of the linkage assembly;
  the second position of the adjustment mechanism includes an expanded position of the linkage assembly;
  the linkage assembly is pivotably coupled to an inward-extending portion of a seating assembly cross member;
  in the collapsed position of the linkage assembly, a forward link of the linkage assembly is disposed above the seat frame;
  in the expanded position of the linkage assembly, the forward link of the linkage assembly is disposed below the seat frame;
  the adjustment mechanism includes a cam lever pivotably coupled to the seatback frame;
  the cam lever defines an armrest;
  the first position of the adjustment mechanism includes a primary position of the cam lever substantially aligned with the seatback frame and wherein the second position of the adjustment mechanism includes a secondary position of the cam lever transverse to the seatback frame; and/or
  the adjustment mechanism includes a telescoping member extending between the seating assembly frame and the seatback panel.

According to another aspect of the present disclosure, a vehicle seating assembly is provided. The vehicle seating assembly includes a seatback pivotably coupled to a seat and movable between an upright position relative to the seat and a substantially parallel position relative to the seat and including a seatback panel coupled to an upper portion of a seatback frame, and an adjustment mechanism extending between the seatback frame and the seatback panel and configured to move from a first position to a second position in response to an actuating force disposed on the adjustment mechanism if the seatback is in the upright position relative to the seat, thereby moving the seatback panel from a first distance relative to the seatback frame to a second distance relative to the seatback frame.

Embodiments of the second aspect of the disclosure can include any one or a combination of the following features:
  the seatback panel defines a load floor if the seatback is disposed substantially parallel to the seat and if the seatback panel is positioned at a first distance relative to the seatback frame;
  the adjustment mechanism includes a latching system configured to maintain the seatback panel at the second distance relative to the seatback frame;
  the adjustment mechanism includes first and second adjustment mechanisms disposed on opposing sides of the seatback panel; and/or
  the adjustment mechanism includes a four bar linkage pivotably coupled to a seating assembly frame.

According to another aspect of the present disclosure, a vehicle seating assembly is provided. The vehicle seating assembly includes a seating assembly frame including a seat frame and a seatback frame. The vehicle seating assembly further includes a panel positioned on the back of the seatback frame and movable between a stored position relative to the seatback frame and an extended position relative to the seatback frame, and an adjustment mechanism extending between the seating assembly frame and the panel and movable between a first position and a second position in response to an actuating force disposed on the adjustment mechanism, wherein if the adjustment mechanism is in the first position, then the panel is in the stored position, and wherein if the adjustment mechanism is in the second position, then the panel is in the extended position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
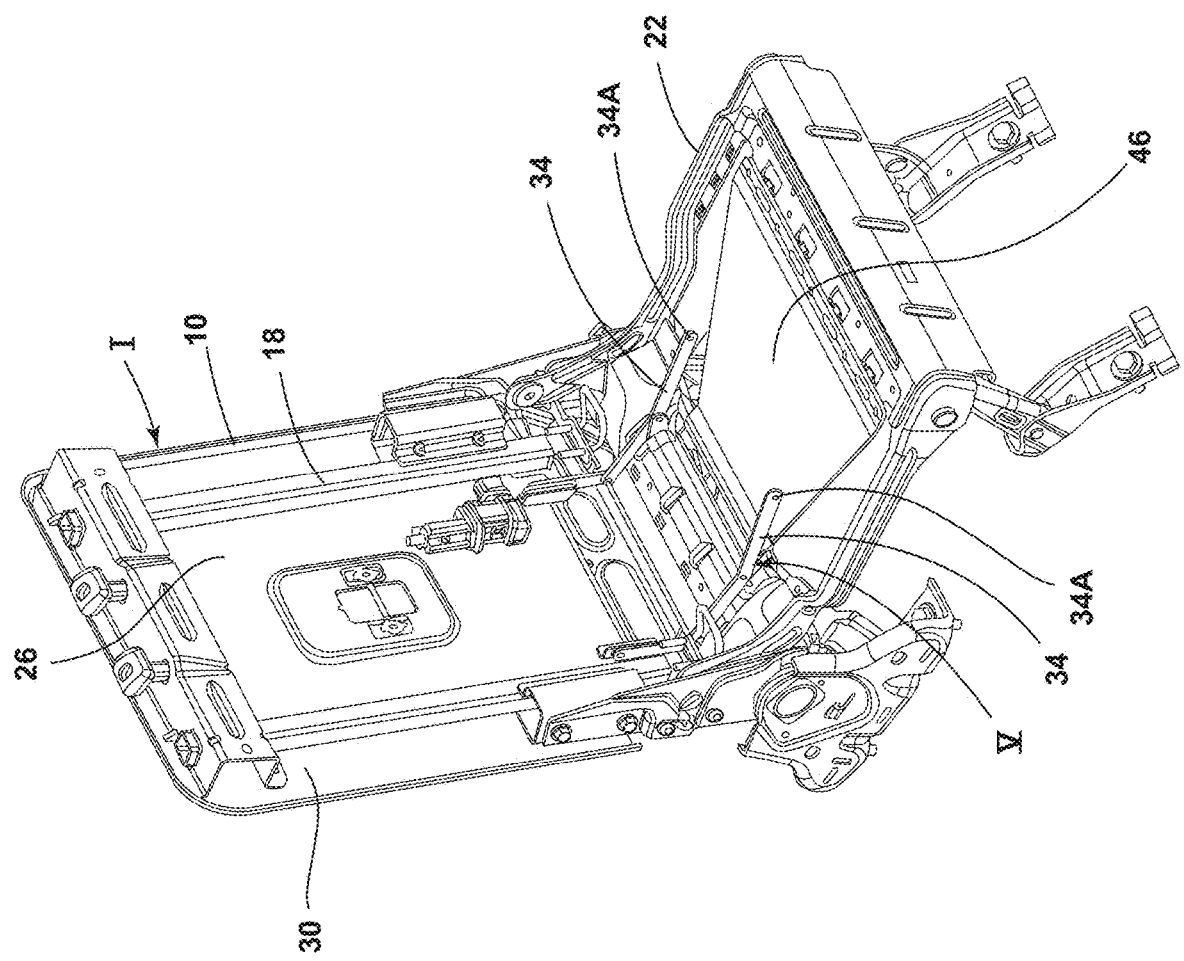
FIG. 1 is a perspective view of a seating assembly frame with a linkage assembly and a seatback panel in a stored position, according to an aspect of the disclosure.

With reference to the vehicle seating assemblies 10 described below and shown in the attached figures, a vehicle seating assembly 10 may be described from the vantage point of an occupant 12 seated in the seating assembly 10. The side of a seating assembly 10 disposed on a right side of a seated occupant 12 may be referred to as a right side of the seating assembly 10. The side of the seating assembly 10 disposed on a left side of a seated occupant 12 may be referred to as a left side of the seating assembly 10.

Referring to FIGS. 1-15, a seating assembly 10 includes a seating assembly frame 14 having a seatback frame 18 and a seat frame 22. A seatback panel 26 is coupled to an upper portion 30 of the seatback frame 18 and movable between a stored position I relative to the seatback frame 18 and an extended position II relative to the seatback frame 18. An adjustment mechanism 34 is coupled to the seatback panel 26 and the seating assembly frame 14 and movable between a first position V and a second position VI. If the adjustment mechanism 34 is in the first position V, then the seatback panel 26 is in the stored position I. If the adjustment mechanism 34 is in the second position VI, then the seatback panel 26 is in the extended position II.

Customers desire a vehicle that may be used for various purposes. Therefore, it is advantageous to configure vehicle seating assemblies 10 to use vehicle space in multiple ways. A seating assembly 10 that may be configured as a load floor 102 may provide additional cargo storage space in a vehicle. A seating assembly 10 may include a seatback 38 and a seat 40. A seating assembly 10 may have a seatback panel 26 that may function as a load floor 102 if the seatback frame 18 is folded flat above the seat 40 and in a substantially parallel position X with the seat 40. If the seatback frame 18 is in the upright position IX, it may be desirable to have the seatback panel 26 extend away from the seat frame 22 to provide additional space for a seated occupant 12 in the seating assembly 10. As such, it may be desirable to have a seatback panel 26 that may be in a stored position I relative to a seatback frame 18 if the seatback 38 is in a substantially parallel position X with the seat 40 and/or if a seating assembly 10 is in the upright position IX.

Referring to FIG. 1, a seating assembly 10 may include a seating assembly frame 14. The seating assembly frame 14 may include a seat frame 22 and a seatback frame 18. A seatback panel 26 may be disposed on the back of the seatback frame 18. The seating assembly 10 may include an adjustment mechanism 34 for moving the seatback panel 26 between the stored position I and the extended position II. The seatback panel 26 is shown in the stored position I.

The adjustment mechanism 34 shown in FIGS. 1-5 includes a linkage assembly 34A. In the example shown, opposing linkage assemblies 34A may be disposed on opposing sides of the seatback panel 26. The linkage assemblies 34A may move between a first position (for example, collapsed position V) and a second position (for example, expanded position VI) in response to an actuating force 42A exerted on the linkage assemblies 34A. Movement of the linkage assemblies 34A from the first position (collapsed position V) to the second position (expanded position VI) may cause the seatback panel 26 to move from the stored position I to the extended position II. A seat panel 46 may be disposed in the seat frame 22. The seat panel 46 may extend from a forward portion 50 of the seat frame 22 to a rearward portion 54 of the seat frame 22. The seating assembly 10 may include mounts 58 for securing the seating assembly 10 to a vehicle floor 62.

Figure 2:
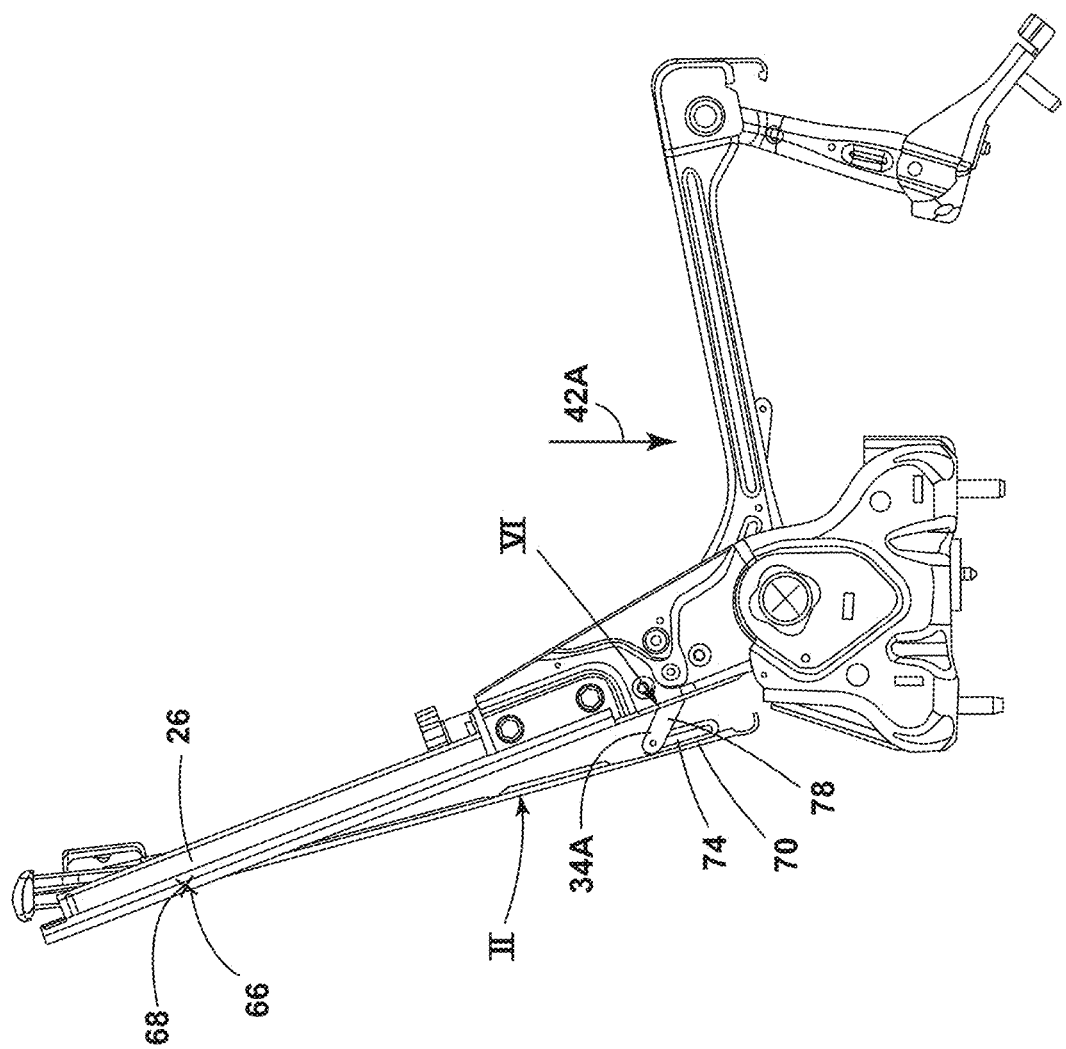
FIG. 2 is a side elevational view of a seating assembly frame with a linkage assembly and a seatback panel in an extended position, according to an aspect of the disclosure.

Referring to FIG. 2, the actuating force 42A exerted on the seating assembly 10 may move the linkage assembly 34A from the collapsed position V to the expanded position VI. The movement of the linkage assembly 34A to the expanded position VI may cause the seatback panel 26 to be pushed from the stored position I to the extended position II. The seatback panel 26 may be coupled to the seatback frame 18 at a seatback panel pivotable coupling 66. A seatback panel axis of rotation 68 may extend through the seatback panel pivotable coupling 66 and may define the seatback panel pivotable coupling 66. The linkage assembly 34A may include a rearward link 70 disposed along the seatback panel 26. The rearward link 70 may include a slot 74 for receiving the intermediate link 78 of the linkage assembly 34A. The seatback panel 26 may be a substantially flat structure that may extend over the seatback frame 18. The seatback panel 26 may be a metal, plastic or other material. The seatback panel 26 may include a tether 82 for mounting cargo to the seatback panel 26. The seatback panel 26 may be covered by a cover.

Figure 3:
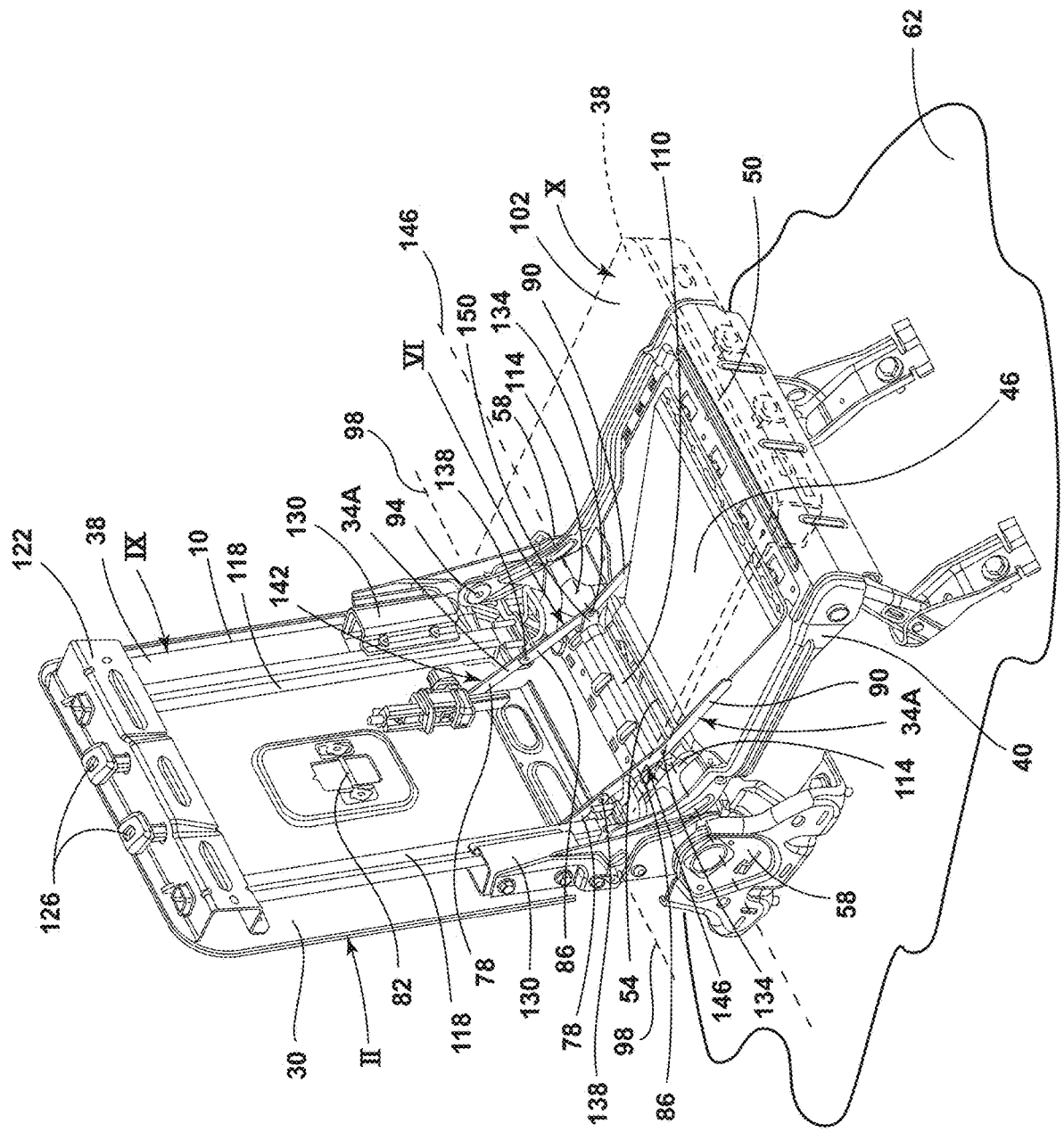
FIG. 3 is a perspective view of a seating assembly frame with a linkage assembly and a seatback panel in an extended position, according to an aspect of the disclosure.

Referring now to FIG. 3, the linkage assembly 34A may include rearward link 70, intermediate link 78, intermediate link 86, and forward link 90. The forward link 90 may be coupled to the seat panel 46. The rearward link 70 may extend along the seatback panel 26. Two intermediate links 78, 86 may be disposed between the forward link 90 and the rearward link 70. The seatback frame 18 may be rotatably coupled to the seat frame 22 at a seatback pivotable coupling

94. The seatback pivotable coupling 94 may be defined by the seatback axis of rotation 98. The seatback frame 18 may move from the upright position IX relative to the seat frame 22 to a substantially parallel position X relative to the seat frame 22 if the seatback frame 18 is rotated about the seatback axis of rotation 98. If the seatback frame 18 is in a substantially parallel position X relative to the seat 40, then the seatback panel 26 may be in the stored position I. If the seatback frame 18 is in a substantially parallel position X relative to the seat 40, then the linkage assembly 34A may be in a collapsed position V. The seatback frame 18 may be in a folded position over the seat frame 22 if the seatback panel 26 creates a load floor 102. A folded position of the seatback frame 18 over the seat 40 may include the seatback frame 18 in a substantially parallel position X relative to the seat frame 22.

Referring again to FIG. 3, a cross member 110 of the seating assembly 10 may be disposed between the mounts 58 at the junction of the seat frame 22 and the seatback frame 18. In the example shown, the cross member 110 may be part of the seat frame 22. In other examples, the cross member 110 may be part of the seatback frame 18, or the cross member 110 may be a separate part. Inward-extending portions 114 at the ends of the cross member 110 may cover components of the seating assembly frame 14.

With continued reference to FIG. 3, the seatback frame 18 may include a pair of opposing upright longitudinal members 118 and an upper cross member 122. The upper cross member 122 may be secured to the pair of opposing upright longitudinal members 118. The upper cross member 122 may include apertures 126 for receiving headrest rods. The seating assembly frame 14 may include a pair of opposing side brackets 130 coupled to the pair of opposing upright longitudinal members 118. The seatback panel 26 may be disposed against the pair of opposing side brackets 130 if the seatback panel 26 is in the stored position I. The seatback panel 26 may be disposed against the pair of opposing upright longitudinal members 118 if the seatback panel 26 is in the stored position I.

With continued reference to FIG. 3, a link pivotable coupling 134 may be between the forward link 90 and the intermediate link 86. A link pivotable coupling 138 may be between an intermediate link 78 and an intermediate link 86. The link pivotable coupling 134 between the forward link 90 and the intermediate link 86 may be coupled to the inward-extending portion 114 of the seating assembly frame 14 at the linkage assembly pivotable coupling 142. The linkage assembly pivotable coupling 142 may be defined by a linkage assembly axis of rotation 146 extending through the linkage assembly 34A and the seating assembly frame 14. A support bracket 150 may extend from the cross member 110 to secure the linkage assembly 34A to the inward-extending portion 114 of the seating assembly frame 14.

Figure 4:
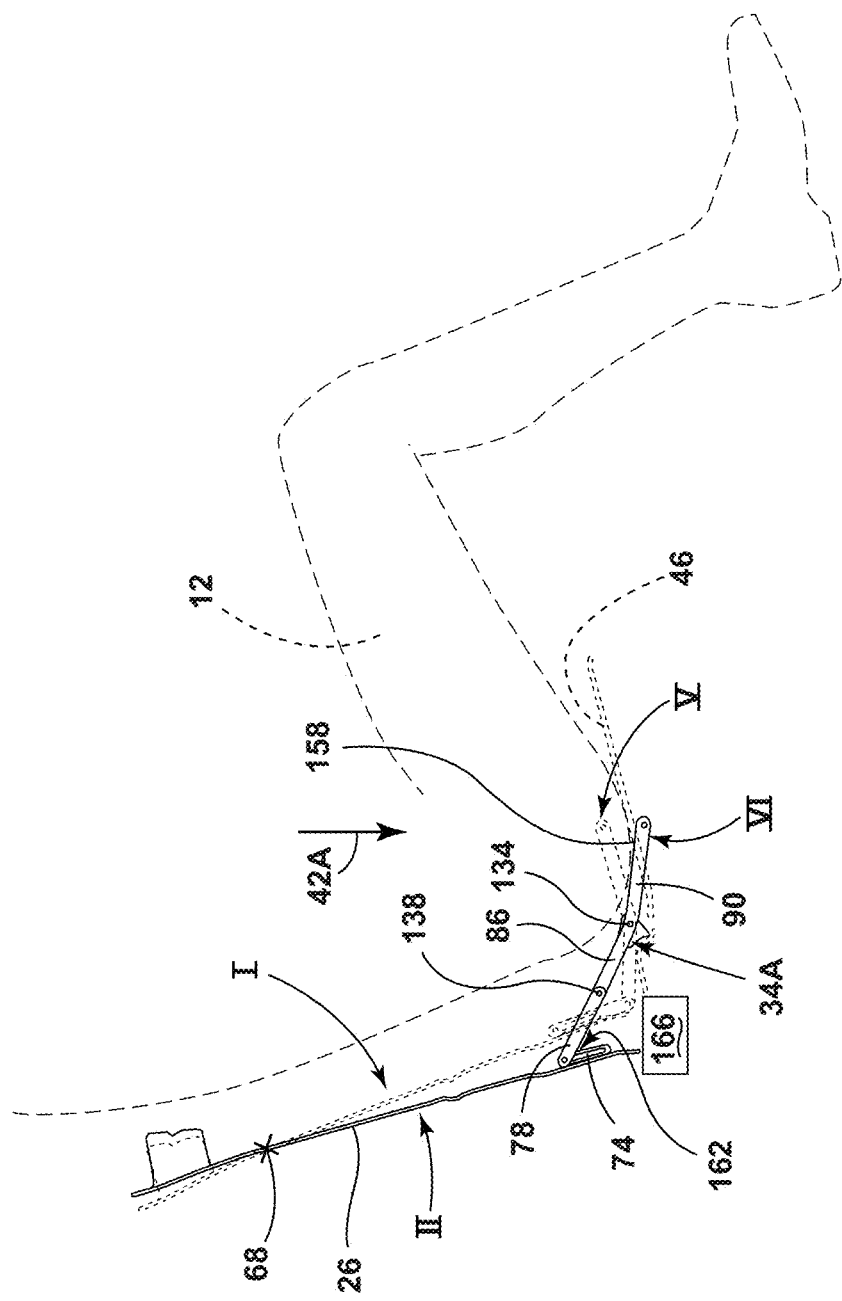
FIG. 4 is a side schematic view of a linkage assembly and the seatback panel in a stored position and an extended position, according to an aspect of the disclosure.

With reference to FIG. 4, the linkage assembly 34A may move from the collapsed position V to the extended position VI in response to an actuating force 42A. The actuating force 42A may be the weight of an occupant 12 sitting on the seating assembly 10. As the linkage assembly 34A moves from the collapsed position V to the expanded position VI, the seatback panel 26 moves from the stored position I to the extended position II. The seatback panel 26 may rotate about the seatback panel axis of rotation 68.

With continuing reference to FIG. 4, the linkage assembly 34A may include a first end 158 coupled to the seat panel 46 and a second end 162 fixed to the seatback panel 21in6. The seatback panel 26 may include a slot 74 for receiving a link 78. If the linkage assembly 34A is in the collapsed position V, then the forward link 90 may be disposed above the seat frame 22. See, FIGS. 1, 5. If the linkage assembly 34A is in the expanded position VI, then the forward link 90 may be disposed below the seat frame 22. See, FIGS. 2, 5. Upon application of an actuating force 42A on the seat panel 46 due to the weight of an occupant 12 or another object, a rotation movement of the linkage assembly 34A is created. The seat panel 46 and the forward link 90 move downward in an arc of rotation that may cause the intermediate links 78, 86 to exert a force on the seatback panel 26 to provide increased space in the seating assembly 10 for occupant comfort. The linkage assembly 34A may lock with a pin-based or other latching mechanism 166 to maintain the linkage assembly 34A in the in the expanded position VI during use of the seating assembly 10 by an occupant 12. If the occupant 12 leaves the seating assembly 10, the seatback panel 26 may return to the stored position I against the seatback frame 18 to create the load floor function of the seatback panel 26. The seatback panel 26 and the seatback frame 18 may be spring-loaded to return the seatback panel 26 to a stored position I after an occupant 12 leaves the seating assembly 10. See, exemplary spring system 290 in FIGS. 14-15.

Figure 5:
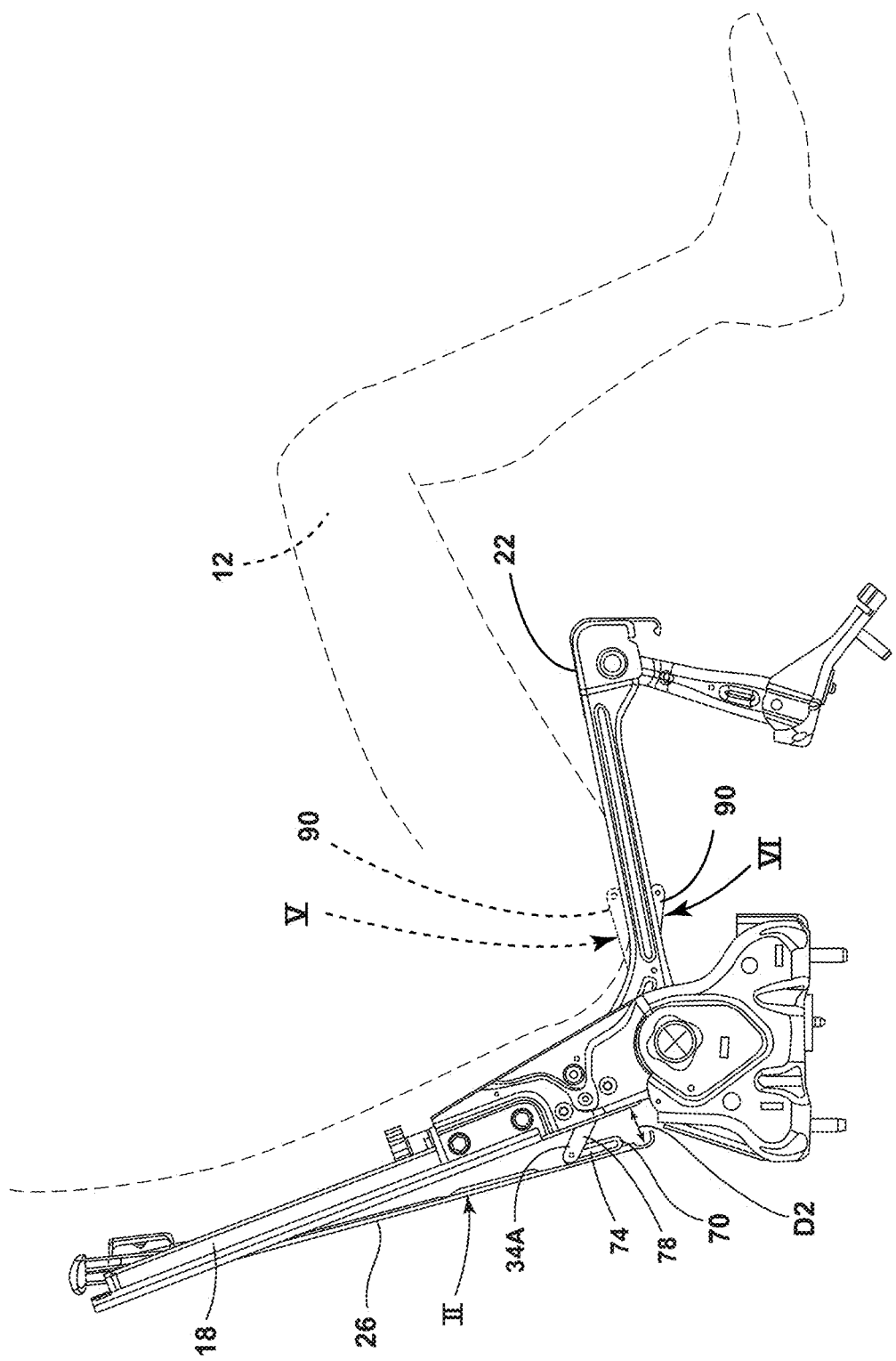
FIG. 5 is a side perspective view a seating assembly frame with a seated occupant and the linkage assembly in a first position and a second position, according to an aspect of the disclosure.

Referring to FIG. 5, if the adjustment mechanism 34 (for example, linkage assembly 34A) is in the collapsed position V, then the seatback panel 26 may be disposed at a first distance D1 relative to the seatback frame 18. If the adjustment mechanism 34 (for example, linkage assembly 34A) is in the second position VI, then the seatback panel 26 may be disposed in a second distance D2 relative to the seatback frame 18. See, exemplary first distance D1 shown in FIG. 7. See, exemplary second distance D2 shown in FIG. 5. In the exemplary first panel distance D1 shown in FIG. 7, the distance D1 may be approximately zero.

Referring again to FIG. 5, the linkage assembly 34A is shown in the collapsed position V and the expanded position VI. If the linkage assembly 34A is in the expanded position VI, then the seatback panel 26 may be in the extended position II.

Referring to FIGS. 6-11, the adjustment mechanism 34 shown includes a cam lever 34B. The cam lever 34B may include a cam portion 190 and a lever portion 194. The lever portion 194 may be an armrest 198. The lever portion 194 may be coupled to the cam portion 190 such that movement of the lever portion 194 moves the cam portion 190. The cam lever 34B may be coupled to the seating assembly frame 14 at a cam lever pivotable coupling 202.

Figure 6:
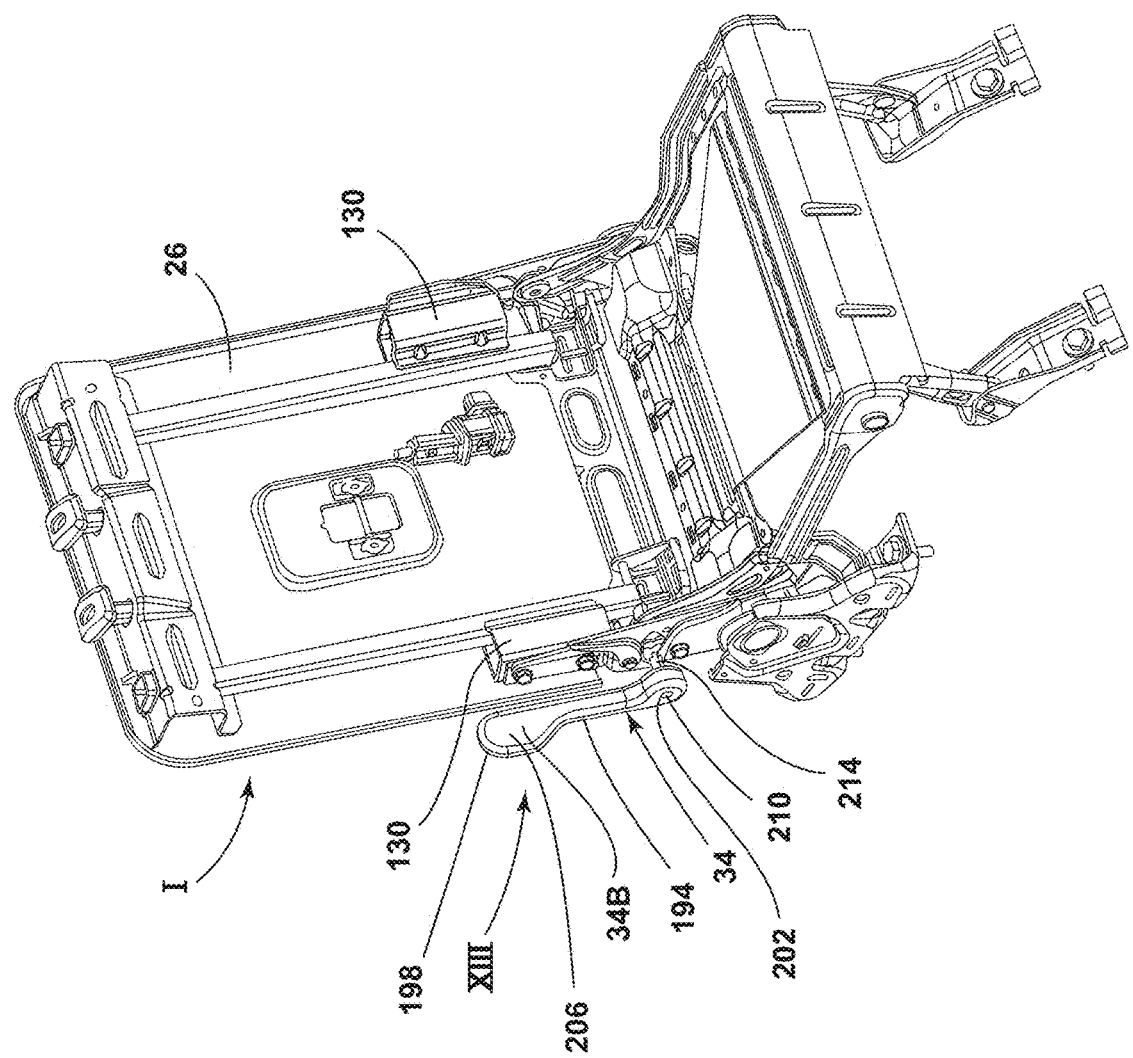
FIG. 6 is a right side perspective view of a seating assembly frame with a cam lever and a seatback panel in the stored position, according to an aspect of the disclosure.

With reference to FIG. 6, the cam lever 34B may be in a primary position XIII aligned with the seatback frame 18. The position of the cam lever 34B when the cam lever 34B is disposed along the seatback frame 18 may be referred to as the primary position XIII of the cam lever 34B. The seatback panel 26 may be in the stored position I when the cam lever 34B is disposed in the primary position XIII aligned with the seatback frame 18.

With continuing reference to FIG. 6, the lever portion 194 may be an armrest 198 with an enlarged flat portion 206 at the end of the armrest 198. The enlarged flat portion 206 may provide a surface for an occupant 12 to rest his or her forearm. The lever portion 194 may include a hole 210 for receiving a pin 214 that may couple the lever portion 194 to the cam portion 190.

Figure 7:
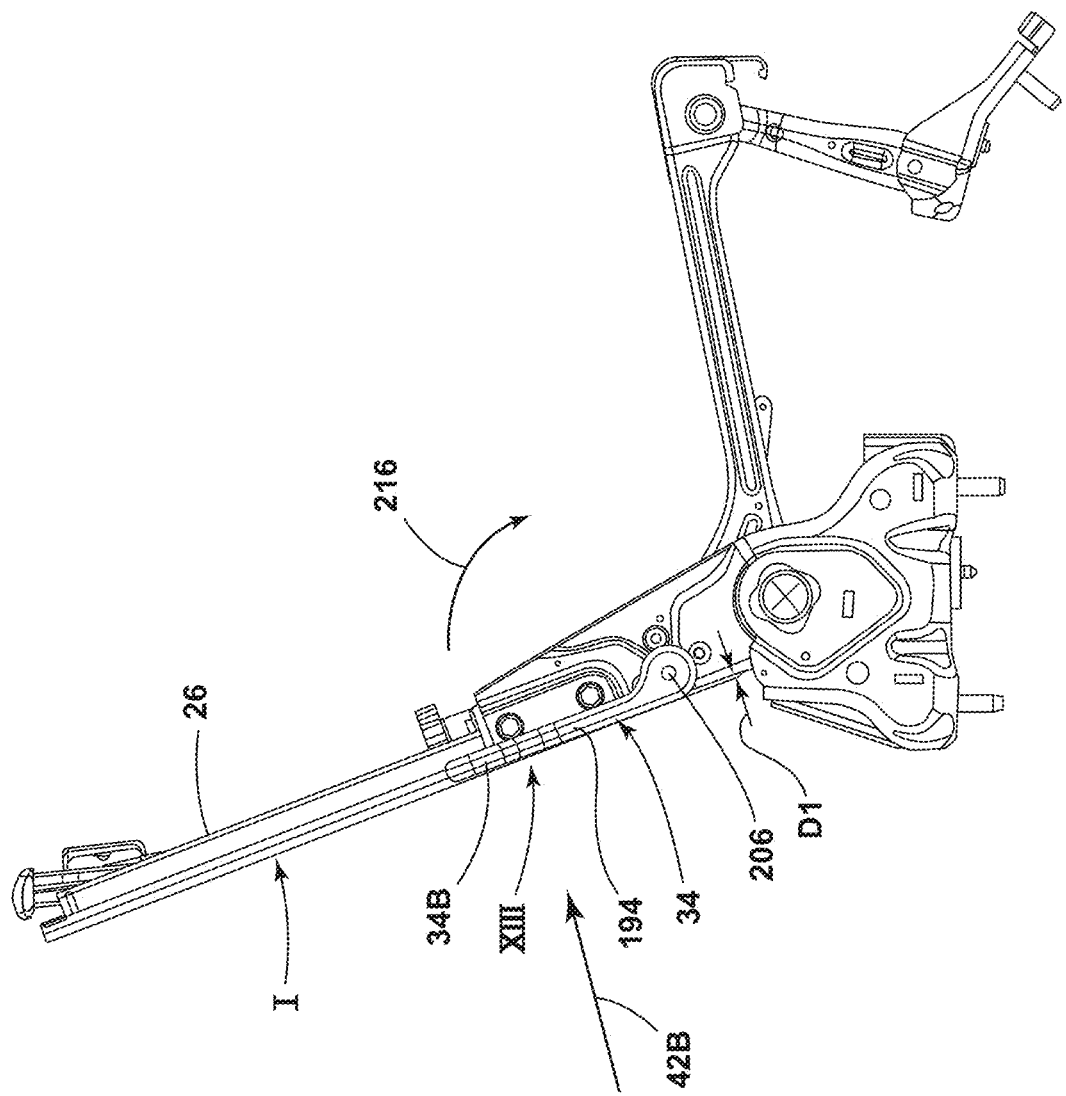
FIG. 7 is a right side elevational view of a seating assembly frame with a cam lever and a seatback panel in the stored position, according to an aspect of the disclosure.

Referring to FIG. 7, an actuating force 42B applied to the lever portion 194 may cause the cam lever 34B to rotate in the direction shown by arrow 216 to move the seatback panel 26 from the stored position I to the extended position II.

Figure 8:
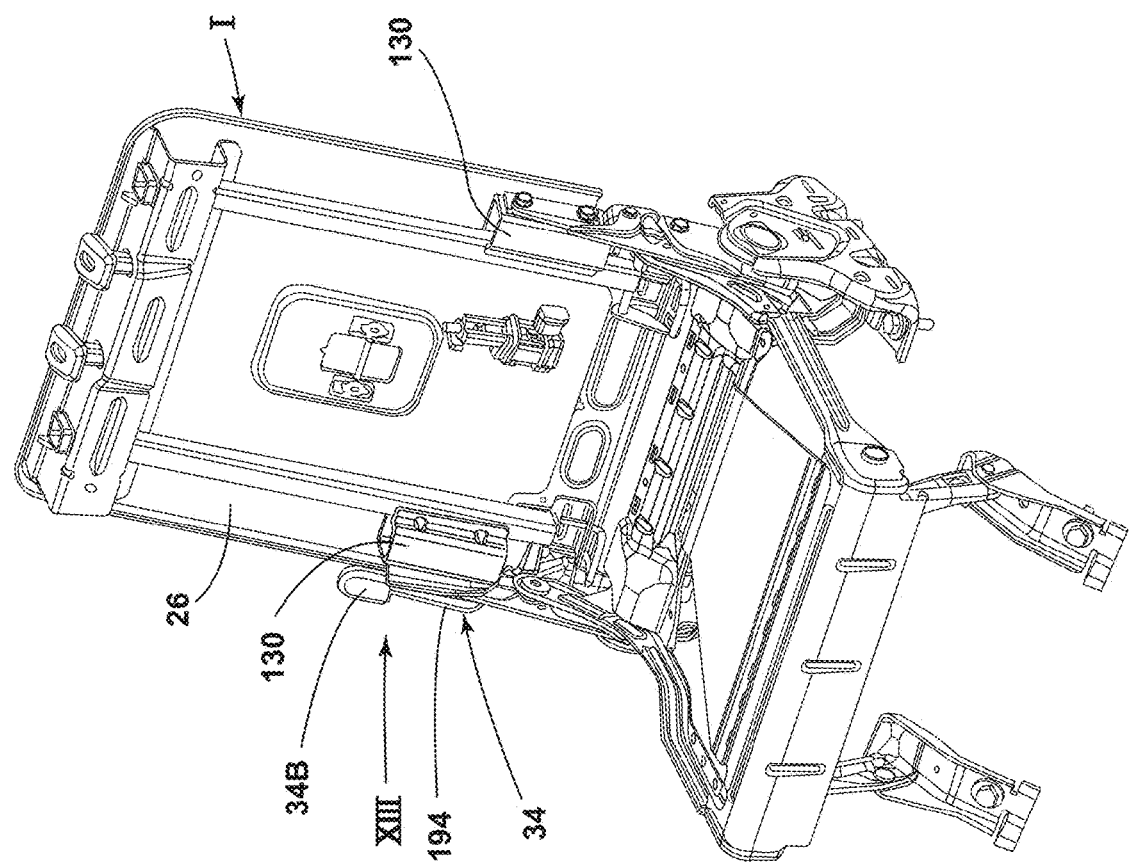
FIG. 8 is a left side perspective view of a seating assembly frame with a cam lever and a seatback panel in the stored position, according to an aspect of the disclosure.

Referring to FIG. 8, the lever portion 194 is shown adjacent to side bracket 130. The seatback panel 26 is in the stored position I.

Figure 9:
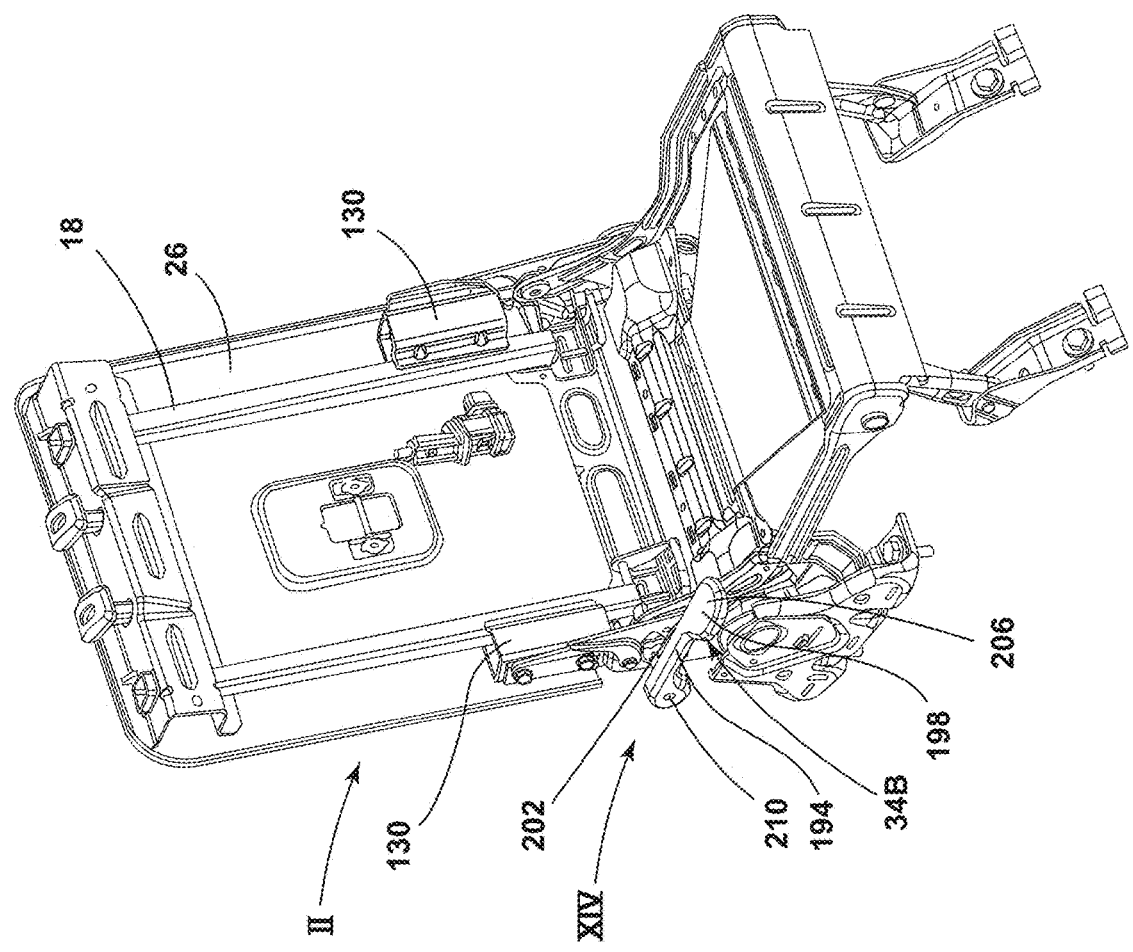
FIG. 9 is a right side perspective view of a seating assembly frame with a cam lever and a seatback panel in the expended position, according to an aspect of the disclosure.

Referring to FIG. 9, the cam lever 34B is shown in the secondary position XIV transverse to the seatback frame 18. The seatback panel 26 is shown in the extended position II relative to the seatback frame 18.

Figure 10:
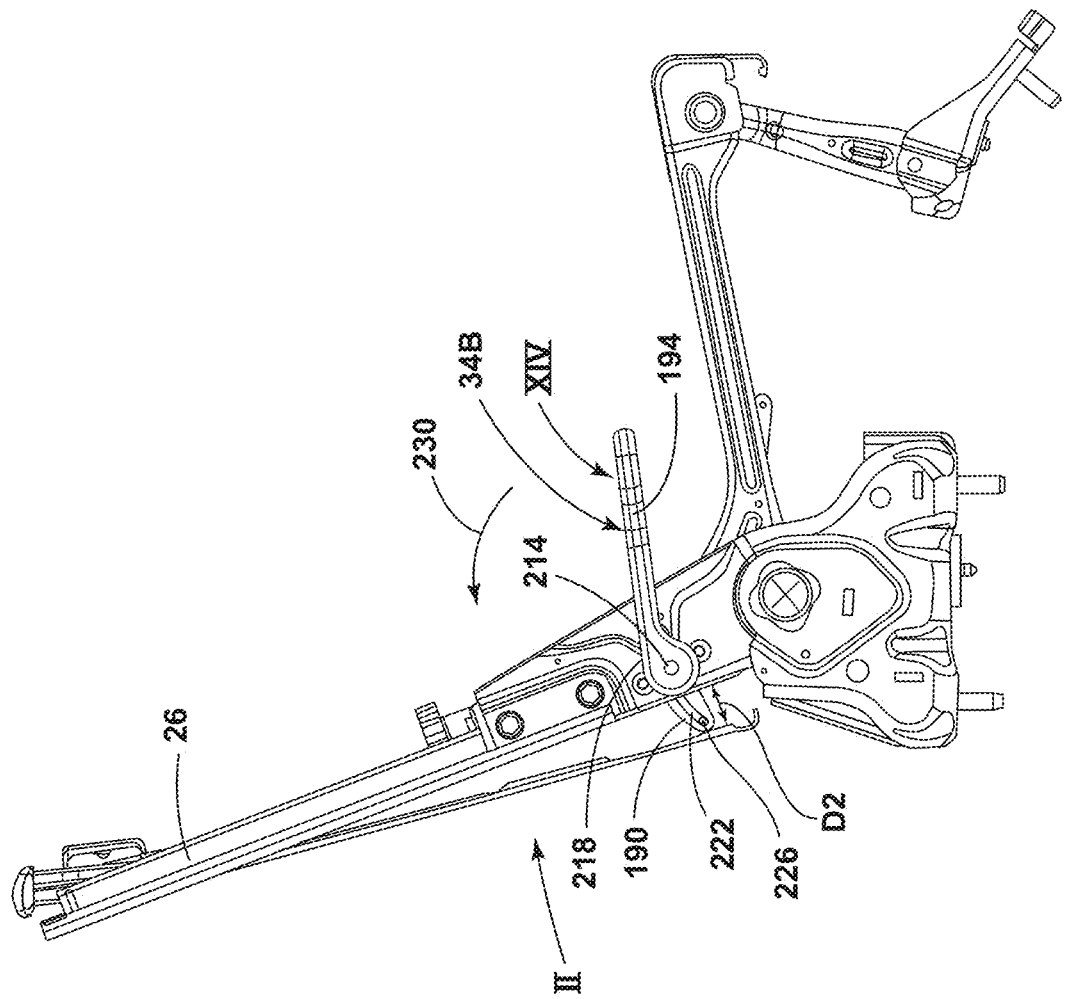
FIG. 10 is a right side elevational view of a seating assembly frame with a cam lever and a seatback panel in the extended position, according to an aspect of the disclosure.

Referring to FIG. 10, the cam lever 34B may be in the secondary position XIV transverse to the seatback frame 18, and the seatback panel 26 may be in the corresponding extended position II relative to the seatback frame 18. The cam lever 34B may include the lever portion 194 and the cam portion 190. The cam portion 190 may be coupled to the lever portion 194 by a pin 214 that may extend through the hole 210 in the lever portion 194. The lever portion 194 may be disposed on the outside of a flange 218 of the seatback frame 18. The cam portion 190 may be disposed on the inside of a flange 218 of the seatback frame 18. The cam portion 190 may include a curved slot 222 that may receive a seatback panel pin 226 that may be coupled to the seatback panel 26. In the example shown, the seatback panel 26 is disposed against an outer portion of the cam portion 190. As the cam lever 34B is rotated in the direction shown by arrow 230, the pin 226 may move along the slot 222 and the cam portion 190 may rotate into a space adjacent to the flange 218, thereby moving the seatback panel 26 from the extended position II to the stored position I.

With continued reference to FIG. 10, the cam lever 34B in the secondary position XIV transverse to the seatback frame 18 may move the seatback panel 26 a distance D2 from the seatback frame 18. In one example, the distance D2 may be in the approximate range of between approximately 20.0 millimeters and approximately 80.0 millimeters and ideally approximately 40.0 millimeters. In another example, the distance D2 may be less than approximately 30.0 millimeters. In yet another example, the distance D2 may be greater than approximately 80.0 millimeters.

Figure 11:
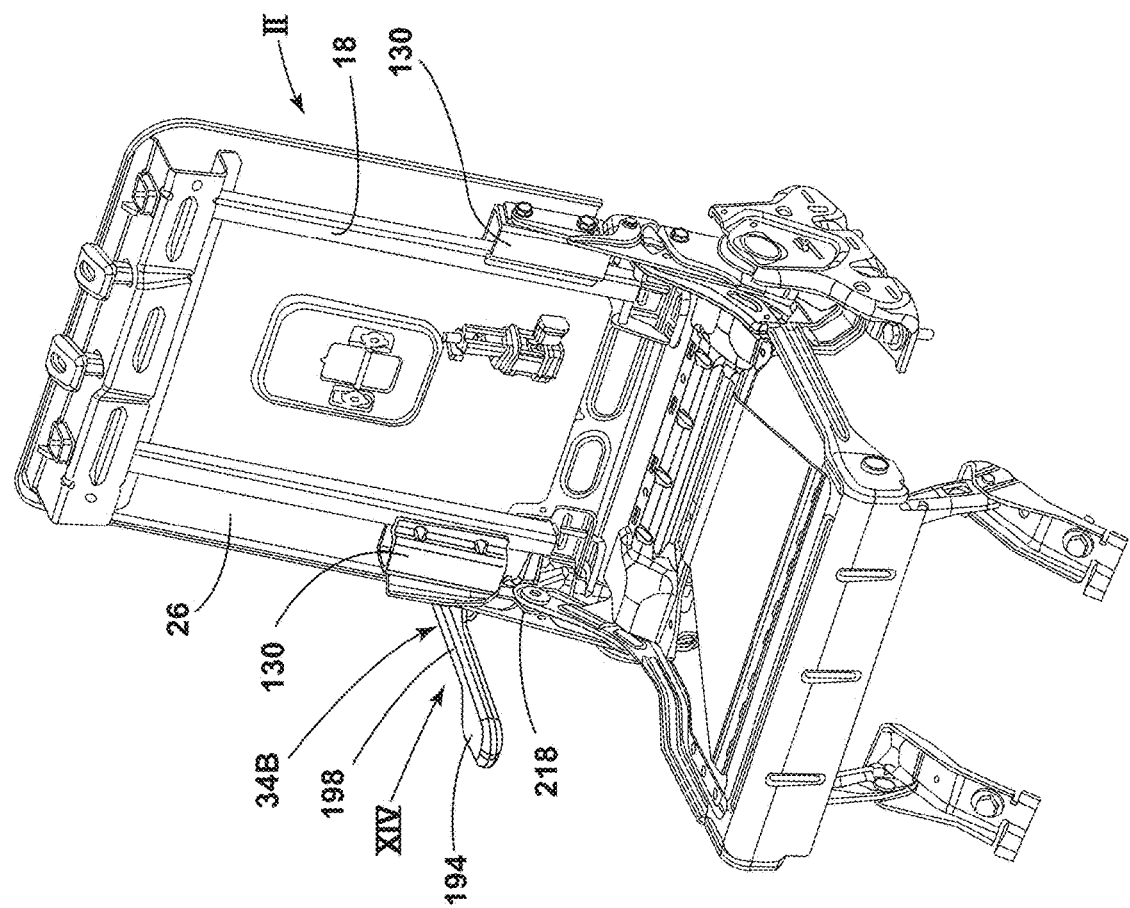
FIG. 11 is a left side perspective view of a seating assembly frame with a cam lever and a seatback panel in the extended position, according to an aspect of the disclosure.

Referring to FIG. 11, the cam lever 34B is shown in the secondary position XIV transverse to the seatback frame 18. It is to be understood that the cam lever 34B may be located on either the right side or the left side of the seatback frame 18. In various aspects, cam levers 34B may be located on both the right and the left sides of the seatback frame 18. In various examples, the cam lever 34B may be located on the bottom of the seating assembly frame 14, the top of the seating assembly frame 14, or elsewhere so that the cam lever 34B may be coupled with the seatback panel 26. In various aspects, the cam lever 34B may be movable between positions other than the primary position XIII aligned with the seatback frame 18 and the secondary position XIV transverse to the seatback frame 18 to move the seatback panel 26 between the stored position I and the extended position II.

Figure 12:
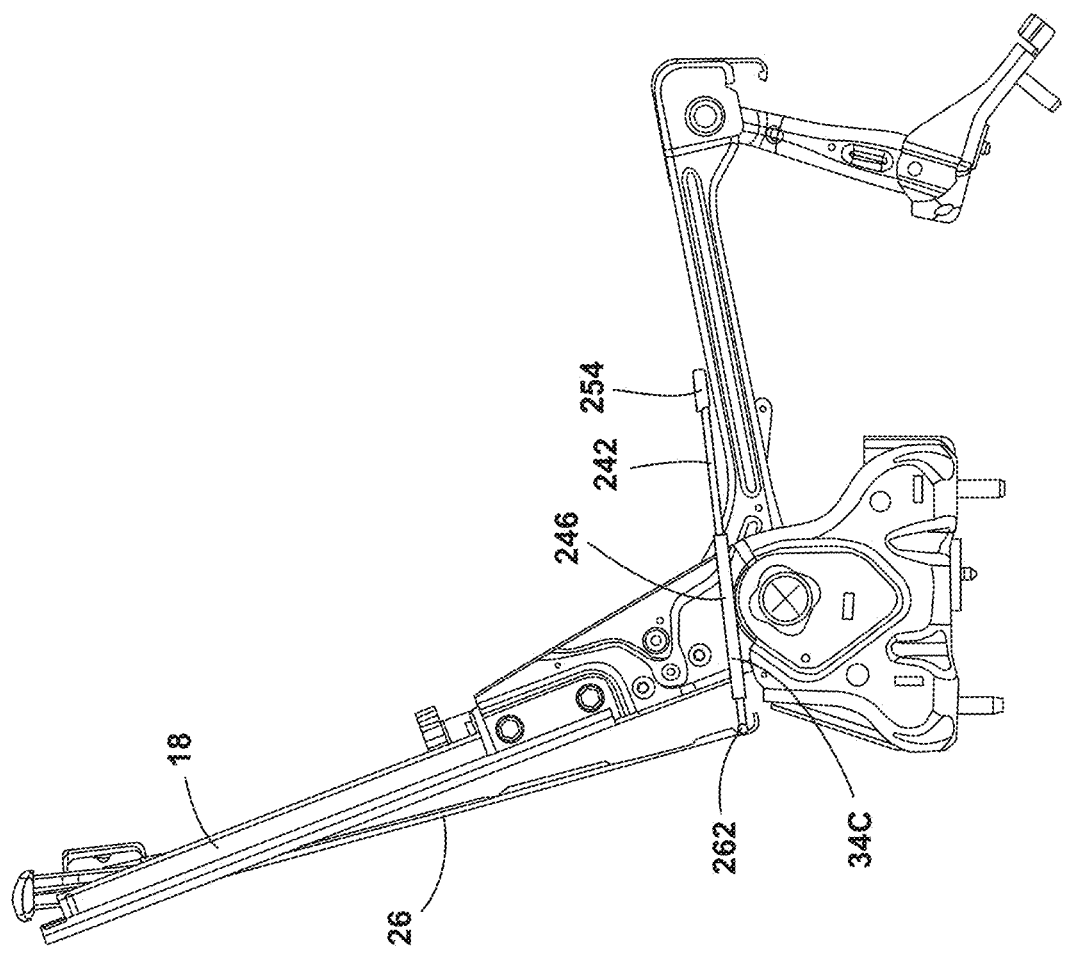
FIG. 12 is a schematic view of a seating assembly frame with a telescoping member and a seatback panel in the extended position, according to an aspect of the disclosure.
Figure 13:
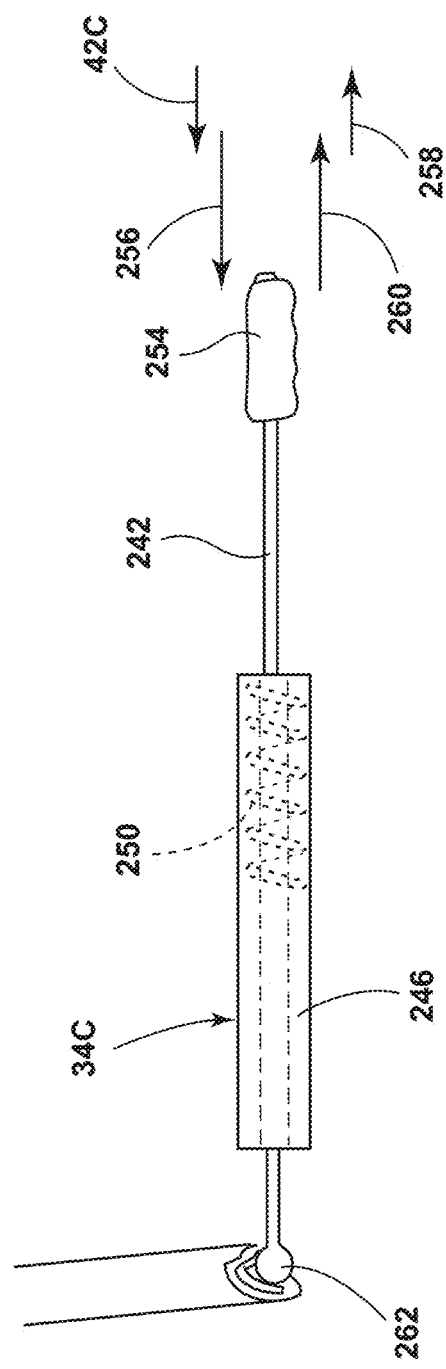
FIG. 13 is a schematic view of a guide sleeve, according to an aspect of the disclosure.

Referring to FIGS. 12-13, an adjustment mechanism 34 may include a telescoping member 34C. The telescoping member 34C may include a guide 242, a sleeve 246, and a spring 250. The guide 242 may include a handgrip 254. The handgrip 254 may include a cylindrical cavity that may be pushed over the guide 242. The handgrip 254 may be rubber, plastic, or another material. The handgrip 254 may include a bumpy outer surface that the fingers of a user may conveniently hold on to. A cross-section of the guide 242 may be circular. A cross-section of the sleeve 246 may be circular. A user may exert an actuating force 42C on the handgrip 254 by pushing the handgrip 254 in the direction shown by arrow 256 to move the seatback panel 26 from the stored position I to the extended position II. A user may exert a return force 258 in the direction shown by arrow 260 on the handgrip 254 by pulling the handgrip 254 in the direction shown by arrow 260 to move the seatback panel 26 from the extended position II to the stored position I. The telescoping member 34C may be coupled to the seating assembly frame 14. A distal end 262 of the telescoping member 34C may be coupled to the seatback panel 26. In various aspects, the telescoping member 34C may be located on either the right side or the left side of the seating assembly frame 14. In various aspects, telescoping members 34C may be located on right and left sides of the seating assembly frame 14. In various aspects, the telescoping member 34C may be located on places of the seating assembly frame 14 other than the right and/or left sides of the seating assembly frame 14.

Figure 14:
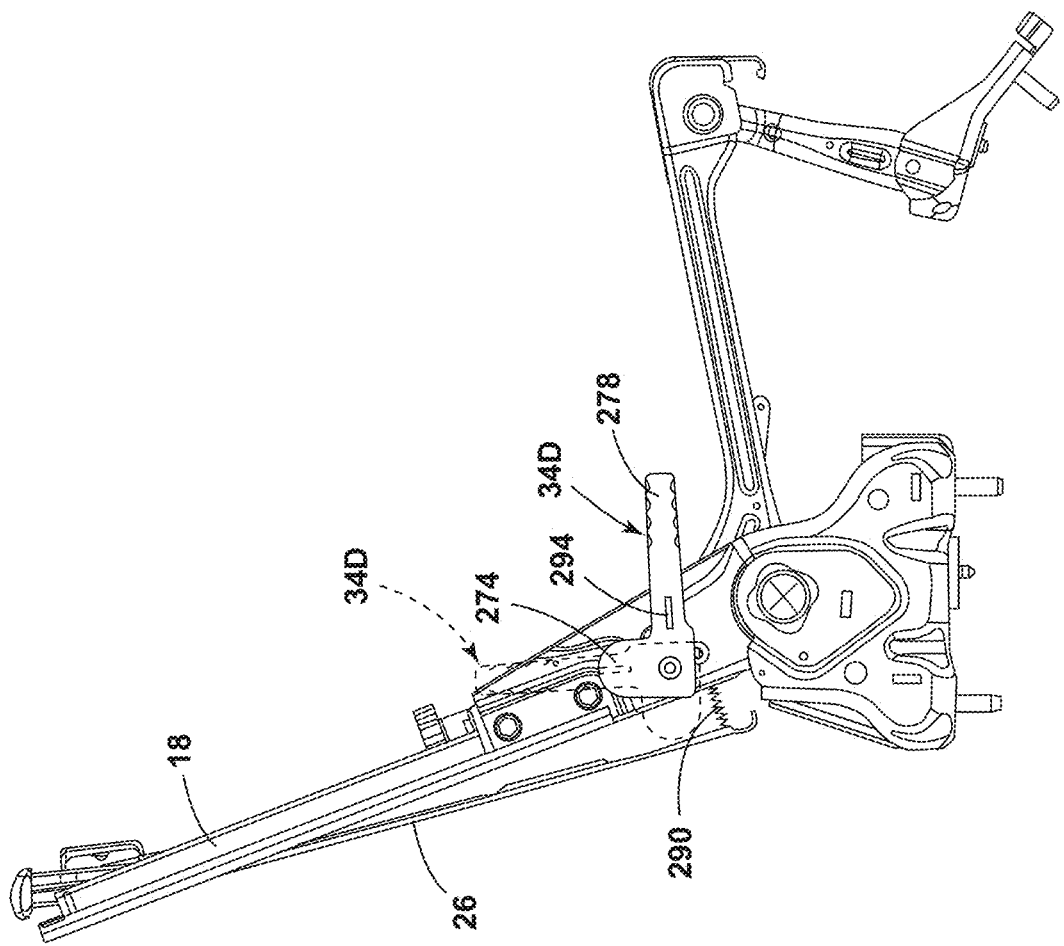
FIG. 14 is a schematic view of a seating assembly frame with an alternate cam lever and a seatback panel in the stored position, according to an aspect of the disclosure.
Figure 15:
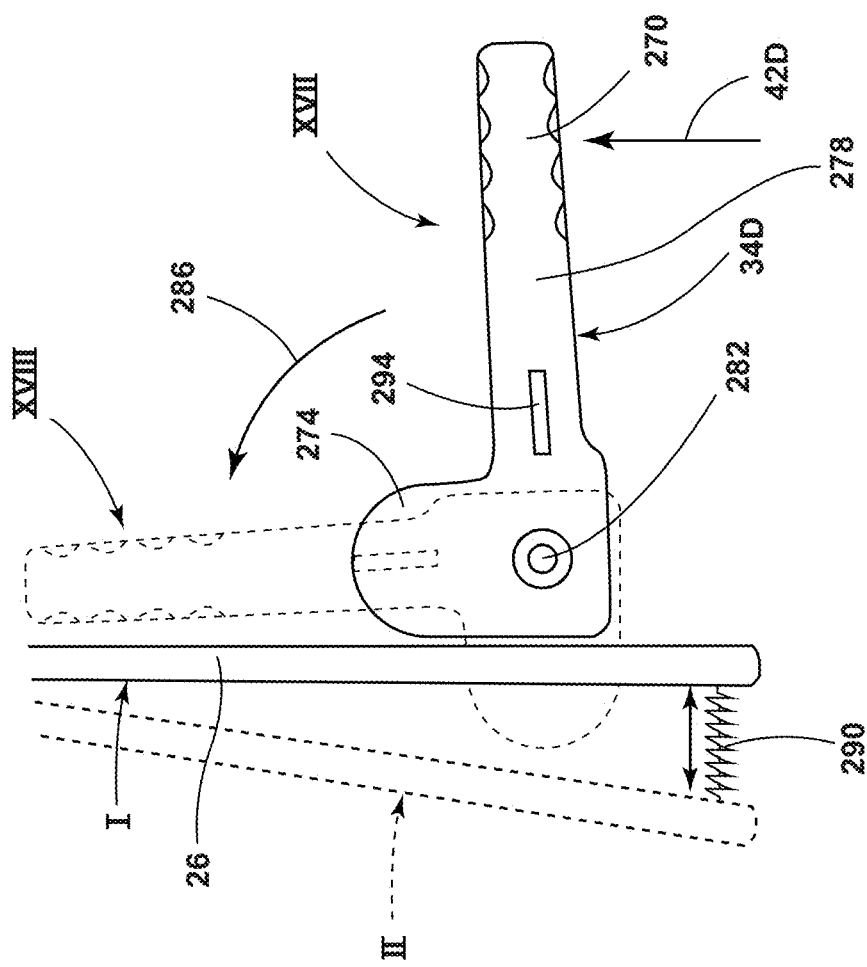
FIG. 15 is a schematic view of a seating assembly frame with an alternate cam lever and a seatback panel in the stored position and the extended position, according to an aspect of the disclosure.

Referring to FIGS. 14-15, an adjustment mechanism 34 may include a cam lever 34D. The cam lever 34D may include a cam hand grip 270. The cam lever 34D may be disposed on the seatback frame 18. The cam lever 34D may move from an initial position XVII transverse to the seatback frame 18 to a final position XVIII aligned with the seatback frame 18. The cam lever 34D may include a cam portion 274 and a lever portion 278. The cam lever 34D may be rotatable about the cam lever pivotable coupling 282 in the direction shown by arrow 286 and in response to actuating force 42D. The cam lever 34D may be secured to the seating assembly frame 14 at the cam lever pivotable coupling 282. In various examples, the handgrip 270 may be integral to the lever portion 278, or the handgrip 270 may be a separate part. The handgrip 270 may include a cylindrical cavity that may be pushed over the lever portion 278. The handgrip 270 may be rubber, plastic, or another material. The handgrip 270 may include a bumpy outer surface that the fingers of a user may conveniently hold on to. A spring system 290 may be disposed between the seatback panel 26 and the seating assembly frame 14. The spring system 290, together with the rotation of the cam lever 34D, may move the seatback panel 26 from the extended position II to the stored position I. A latch and cable release 294 may be coupled with the seating assembly frame 14. The latch and cable release 294 may release the cam lever 34D from the seating assembly frame 14 to allow the cam lever 34D to rotate about the cam lever pivotable coupling 282 from a final position XVIII alighted with the seatback frame 18 to an initial position XVII transverse to the seatback frame 18. The latch and cable release 294 may be one example of a latching mechanism 166. See, FIG. 4. In various aspects of the disclosure, the cam levers 34D may be disposed on one or both sides of the seating assembly frame 14.

With reference to FIGS. 1-15, a vehicle seating assembly 10 includes a seatback 38 pivotably coupled to a seat 40 and movable between an upright position IX relative to the seat 40 and a substantially parallel position X relative to the seat 40. See, FIG. 3. The seatback 38 includes a seatback panel 26 coupled to an upper portion 30 of the seatback frame 18. The vehicle seating assembly 10 includes an adjustment mechanism 34 extending between the seatback frame 18 and the seatback panel 26. The adjustment mechanism 34 is configured to move from a first position (for example, the collapsed position V for the linkage assembly 34A) to a second position (for example, the expanded position VI for the linkage assembly 34A) in response to an actuating force 42 disposed on the adjustment mechanism 34 if the seatback 38 is in the upright position IX relative to the seat 40, thereby moving the seatback panel 26 from a first distance D1 relative to the seatback frame 18 to a second distance D2 relative to the seatback frame 18. The adjustment mechanism 34 may include a latching mechanism 166 configured to maintain the seatback panel 26 at the second distance D2 relative to the seatback frame 18.

The seatback panel 26 may be positioned to function as a load floor 102 if the seatback frame 18 is in a substantially parallel position X relative to the seat 40 and if the seatback panel 26 is in the stored position I. The seatback panel 26 may also be positioned to function as a load floor 102 if the seatback panel 26 is in a substantially parallel position X relative to the vehicle floor 62. If the seatback 38 is in a folded position relative to the seat 40, then the seatback panel 26 may also be positioned to function as a load floor 102.

In various aspects of the disclosure, powered actuation may be used to apply an activation force 42 to the adjustment mechanism 34 to move the seatback panel 26 from the stored position I to the extended position II.

A variety of advantages may be obtained by use of the present disclosure. The seatback panel 26 may be placed in a stored position I to create a load floor 102 If the seatback 38 is in the folded position (for example, If the seatback frame 18 is in the substantially parallel position X). If the seatback 38 is in the upright position IX, then the seatback panel 26 may be in the stored position I to generally maximize space behind the seatback 38. If the seatback 38 in in the upright position, then the seatback panel 26 may be in extended position II to provide space for a seating assembly occupant 12. As such, the seatback panel 26 may be a seating assembly feature that may enhance seating assembly function in different seating assembly positions.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A seating assembly comprising:
    a seating assembly frame including:
        a seatback frame; and
        a seat frame;
    a seatback panel coupled to an upper portion of the seatback frame and movable between a stored position relative to the seatback frame and an extended position relative to the seatback frame, wherein a lower portion of the seatback panel in the extended position is located vehicle rearward relative to the lower portion of the seatback panel in the stored position; and
    an adjustment mechanism coupled to the seatback panel and the seating assembly frame and movable between a first position and a second position in response to an actuating force, wherein the adjustment mechanism includes a cam lever having a cam portion and a lever portion pivotably coupled to the seatback frame, wherein the cam lever defines an armrest, wherein in the first position of the adjustment mechanism, the seatback panel is in the stored position and the cam lever is in a substantially aligned orientation with respect to the seatback frame, wherein in the second position of the adjustment mechanism, the seatback panel is in the extended position and the cam lever is in a substantially transverse orientation with respect to the seatback frame, and wherein moving the cam lever between the substantially aligned and substantially transverse orientations drives the adjustment mechanism to move the seatback panel between the stored and extended positions.

2. The seating assembly of claim 1, further comprising:
    a seatback panel pivotable coupling including the cam lever, the seatback panel and the seatback frame and defined by a seatback panel axis of rotation extending through the seatback panel and the seatback frame.

3. The seating assembly of claim 2, wherein the seating assembly is a vehicle seating assembly.

4. The seating assembly of claim 3, wherein the cam portion is disposed on the lever portion of the cam lever.

5. The seating assembly of claim 4, wherein the cam portion is slidably engaged with the seatback panel as the adjustment mechanism moves between the first and second positions.

6. The seating assembly of claim 1, wherein the cam portion comprises a curved slot.

7. The seating assembly of claim 6, wherein the curved slot is configured to receive a pin coupled to the seat back panel.

* * * * *